United States Patent [19]
Humphrey

[11] 3,761,157
[45] Sept. 25, 1973

[54] IMMERSED TELESCOPE STABILIZER
[75] Inventor: William E. Humphrey, Oakland, Calif.
[73] Assignee: Optical Research and Development Corporation, Oakland, Calif.
[22] Filed: Jan. 5, 1972
[21] Appl. No.: 215,485

[52] U.S. Cl. .................................. 350/16, 350/179
[51] Int. Cl. ............................................ G02b 23/00
[58] Field of Search .............................. 350/16, 179

[56] References Cited
UNITED STATES PATENTS
3,532,409  10/1970  Humphrey ........................... 350/16

Primary Examiner—David H. Rubin
Attorney—Townsend & Townsend

[57] ABSTRACT

A telescope is supported and biased in alignment with a light path defined between light entrance and exit windows in a fluid filled chamber. The fluid, acting on both the sidewalls of the chamber and the sidewalls of the telescope, causes the telescope to undergo proportional angular motion with respect to an inertial reference system when the chamber is subjected to vibrational angular motion with respect to the reference system. Combinations of telescope magnifications with fluid indices of refraction as well as variable telescope-chamber motion relationships are disclosed for achieving image stabilization against accidental angular motion.

18 Claims, 11 Drawing Figures

PATENTED SEP 25 1973 3,761,157
SHEET 1 OF 4
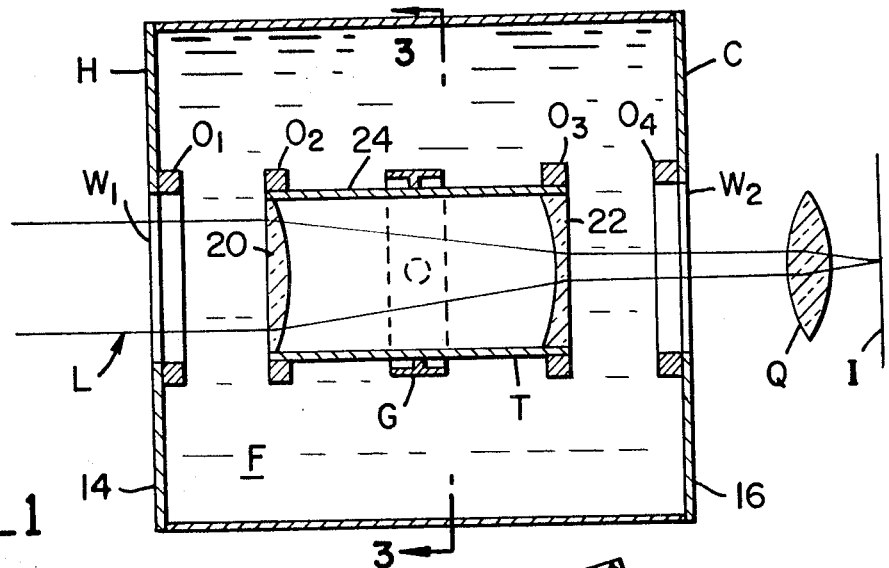
FIG_1
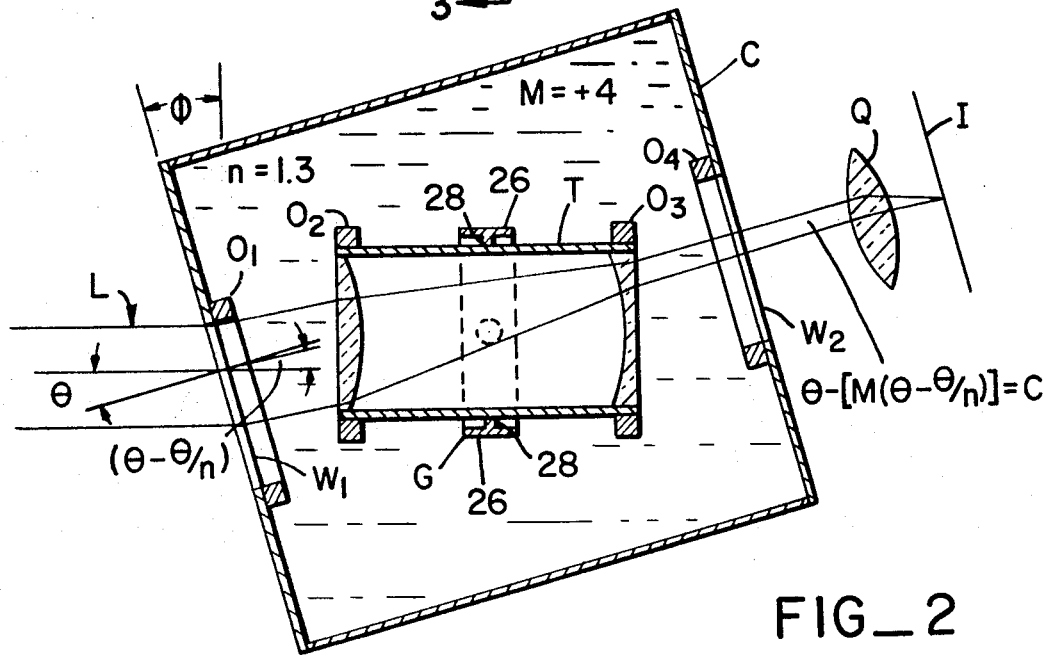
FIG_2
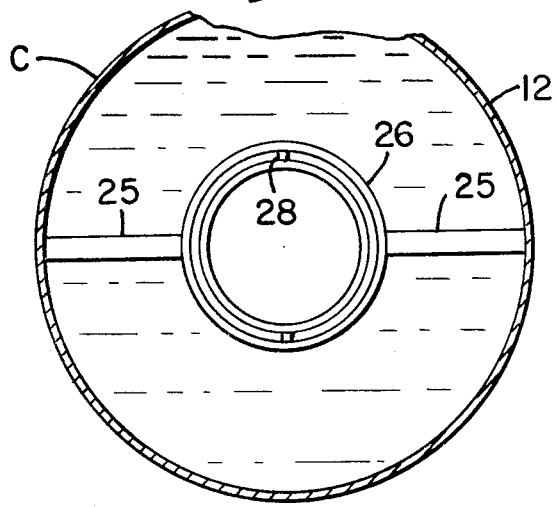
FIG_3

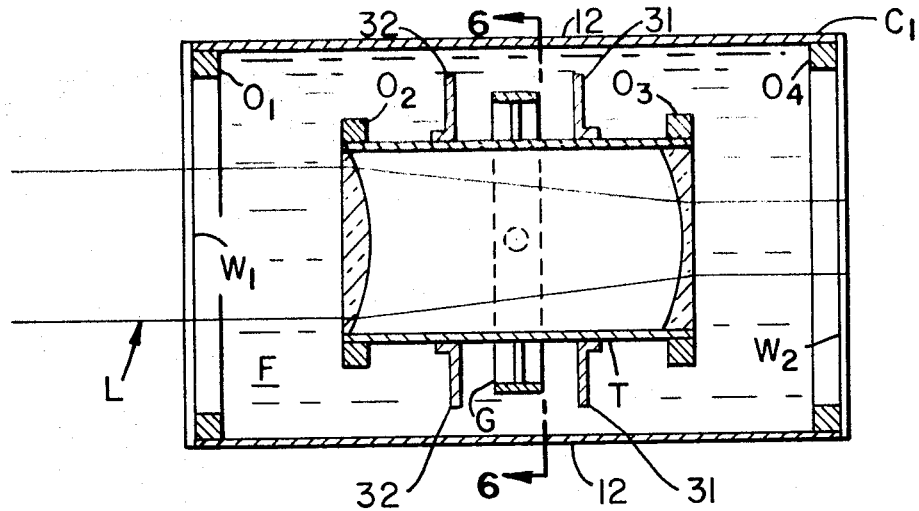
FIG_4
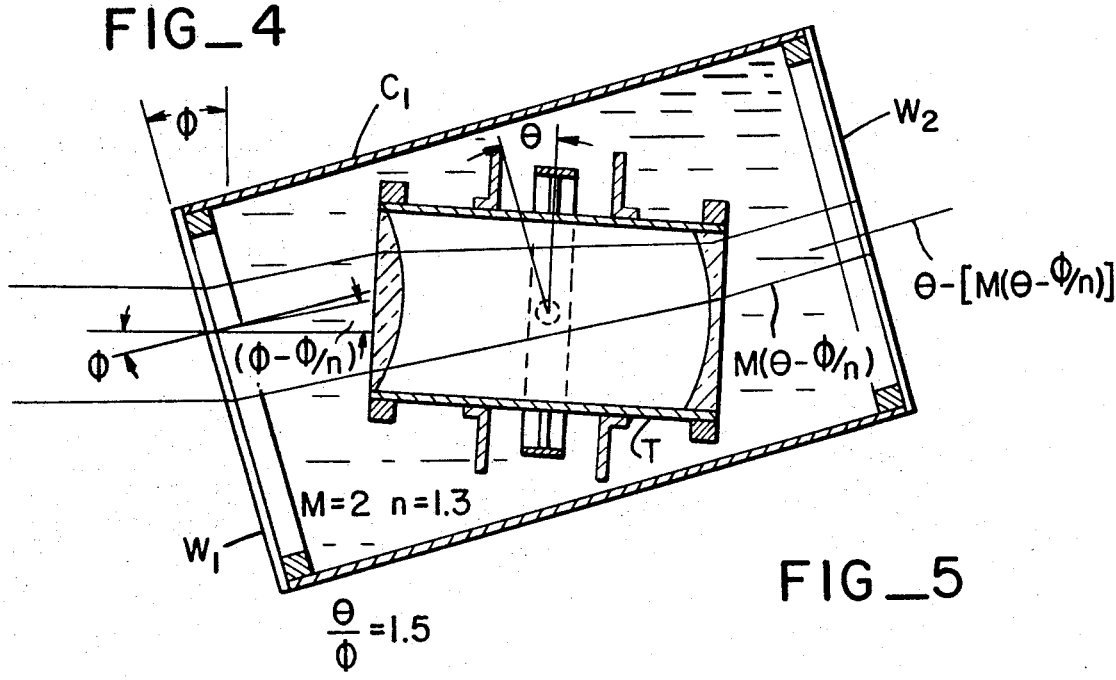
FIG_5
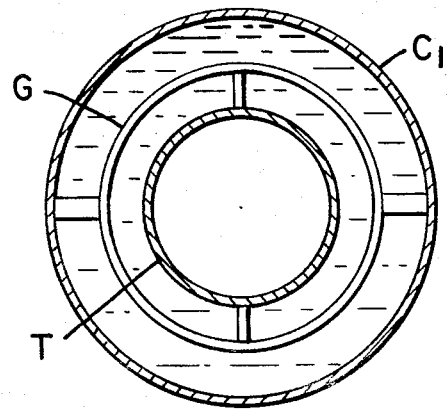
FIG_6

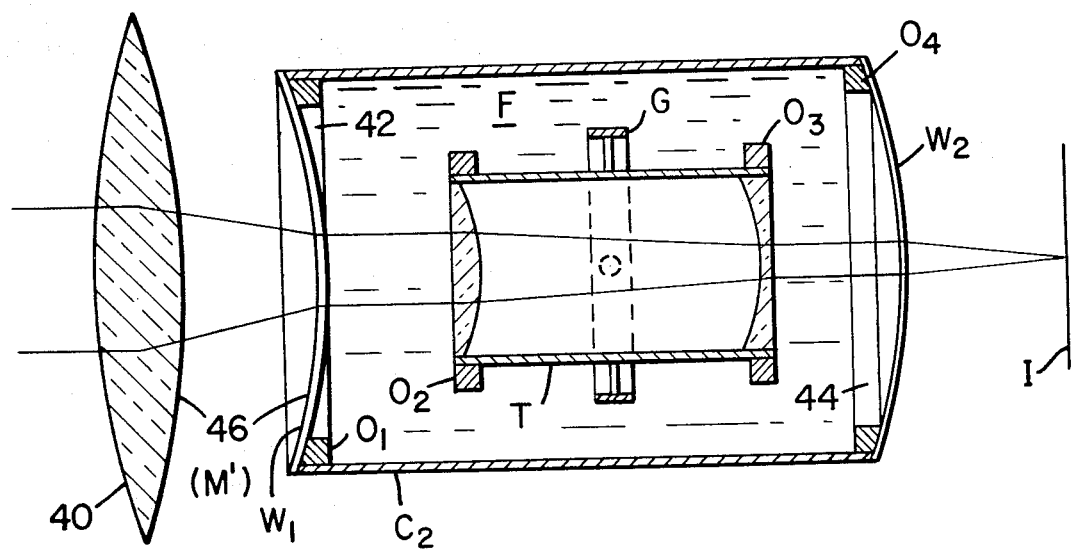
FIG_7
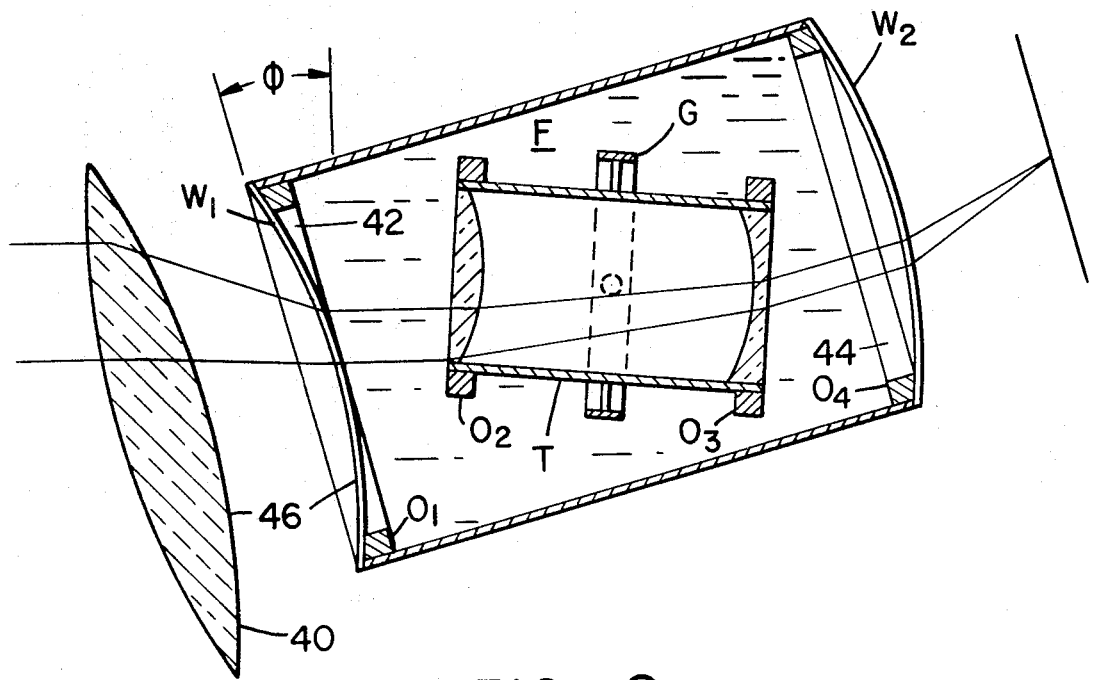
FIG_8

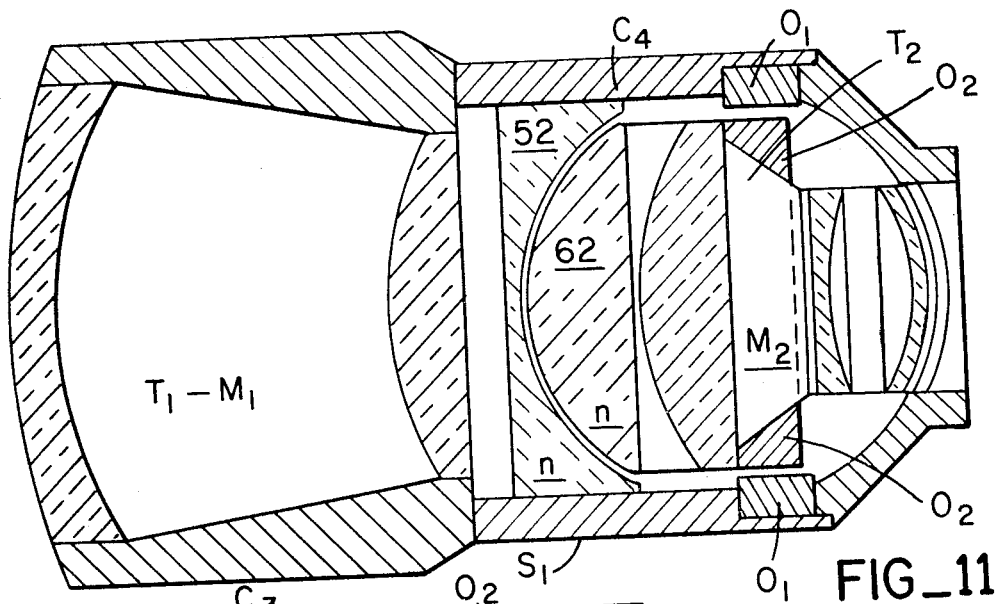
FIG_11
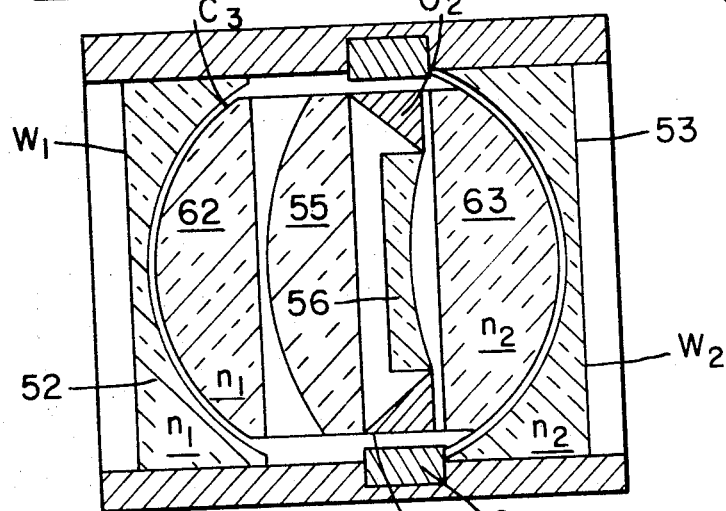
FIG_9
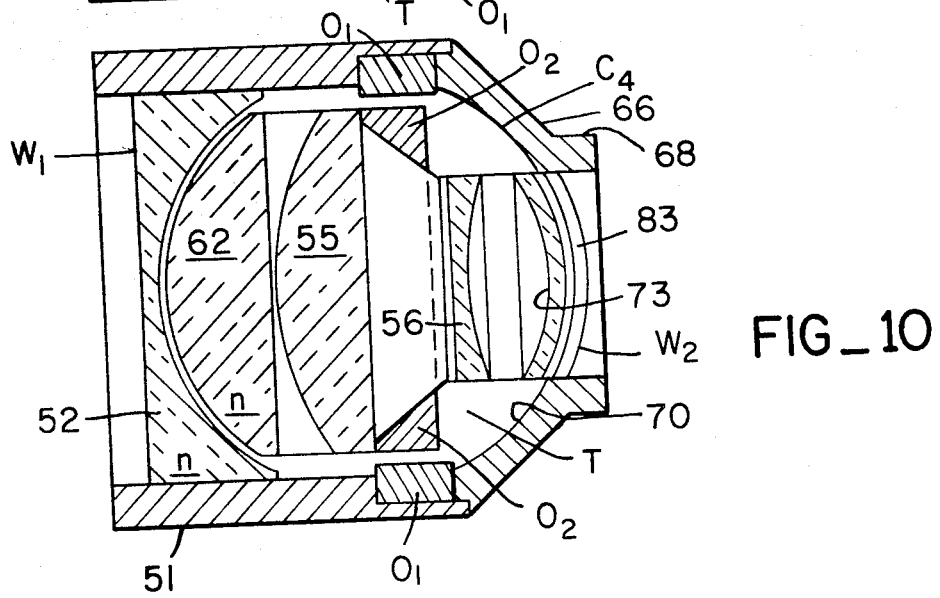
FIG_10

IMMERSED TELESCOPE STABILIZER

This invention relates to optical stabilizers for counter acting the effects of ambient vibrations from optical instruments such as hand-held telescopes of high power. More particularly, the present invention relates to a hydrostatically supported telescope within an optic light path which is proportionally fluid coupled to a reference coordinate system or orientation in space during instrument vibration. The relationship between the power of the telescope, the index of refraction of the fluid bath, the power of the remainder of the optical train and the proportional couple of the telescope to a reference coordinate system is disclosed.

It is already known to inertially stabilize using a hydrostatically supported mirror within an optical train. See for example, Patent Application Ser. No. 75,965, filed Sept. 28, 1970, entitled "Mirror Stabilizer Having Spaced Referenced Motion", now William E. Humphrey U.S. Pat. No. 3,711,178, issued Jan. 16, 1973. As distinguished from this prior invention, this application relates to immersed telescopes.

An object of the present invention is to provide a space couple through fluid between an immersed telescope on one hand and the chamber sidewalls of a fluid filled chamber on the other hand. Typically, the chamber defines between paired windows on either side a light path and has the telescope mounted in the light path. The telescope undergoes a preselected proportional movement with reference to space when the chamber is moved with reference to space. By selecting the optics of the immersed telescope and the indices of refraction of the fluid bath, stabilizing image deflection can be obtained.

An advantage of this invention is that the reflection or retrodirection of light from a mirror is not required.

An additional advantage of this invention is that for relatively large degrees of telescope motion, equal and opposite optical wedges are generated along the light path between the end of each window and the immersed telescope; a partial chromatic correction results.

An advantage of forming the optical wedges from the glass of the fluid chamber windows is that higher indices of refraction may be used. The inherent limitation of a relatively low index of refraction common with most usable transparent liquids is avoided.

Yet another advantage of forming the optical wedges in the glass window is that light deflection can be made to occur at one window and not at the remaining window. With this configuration more convenient and suitable optic powers can be used for the immersed telescope.

Still another advantage of generating the optic wedges in the glass of the chamber windows is that the effect on a liquid of temperature changes, viscosity changes and surface effects can be minimized. A gaseous fluid, such as in air, can be used.

A further advantage of this invention is that the stabilization is relatively insensitive to translational errors of the telescope along the optic path.

Yet another advantage of this invention is that a telescope of simple construction can be readily designed for being immersed in a fluid filled chamber.

Yet another advantage of one embodiment of this invention is that the surfaces of the window in the chamber as well as some of the lenses of the telescope can all be substantially planar. With this construction optical problems created at the interface between the fluid bath and the window and lenses are minimized.

A further advantage of this invention is that the stabilizer can be used with optical instruments having a wide variety of design configurations.

An additional object of this invention is to utilize the index of refraction of the telescope supporting fluid to obtain the desired refraction of the stabilized light.

An advantage of utilizing this index of refraction is that even in the case where the telescope remains stationary with respect to a spatial reference during angular movement of the chamber in space, the indices of refraction can be used to increase the deflection generated by the motion of the casing containing the telescope.

An advantage of the stabilizer of this invention is that it can be mounted at a wide range of locations along the optical axis of the stabilized telescope.

A further object of this invention is to provide a telescope and chamber fluid couple where the telescope moves at a rate proportional and opposite to the angular vibrational rate of the chamber with respect to an orientation in space. This can be achieved by constructing a chamber with an elongate section along the optical axis through the chamber.

A further object of the invention is to provide a telescope and chamber fluid couple where the telescope moves at a rate in the same sense and less than the angular vibrational rate of the chamber with respect to an orientation in space. This can be achieved by constructing a chamber with an elongate section normal to the optic axis of the telescope.

A further advantage of this invention is that the couple between the chamber on one hand and the telescope on the other hand will permit numerous chamber configurations, which configurations can be other than spherical and can be changed to accommodate many preselected optical housings.

An advantage of this invention is that the chamber can be provided with a fluid lens that participates in the overall magnifying effect of the optical train.

Other objects, features and advantages of this invention will be more apparent after referring to the following specification and attached drawings in which:

FIG. 1 is a side elevation section illustrating an immersed telescope stabilizer of this invention before undergoing angular motion;

FIG. 2 illustrates the immersed telescope stabilizer of FIG. 1 after undergoing accidental angular motion, the fluid chamber couple here being designed to maintain the telescope parallel to its original spatial orientation;

FIG. 3 is a side elevation section taken along lines 3—3 of FIG. 1;

FIG. 4 is a side elevation section of an alternate embodiment of this invention;

FIG. 5 is a side elevation section of the stabilizer of FIG. 4 after undergoing accidental angular motion, the fluid couple here being designed to impart telescope motion opposite to the angular motion of the casing;

FIG. 6 is a side elevation section taken along lines 6—6 of FIG. 4;

FIG. 7 is a side elevation of the immersed telescope stabilizer of this invention illustrating its placement interior of a Galilean telescope;

FIG. 8 is a side elevation section of the telescope of FIG. 7 after angular motion has occurred;

FIG. 9 is a side elevation section illustrating an immersed telescope stabilizer having optical wedges generated in mating spherical planoconcave and planoconvex lens pairs, one pair of lenses deflecting light as it enters the stabilizer and the remaining pair of lenses deflecting light as it exits the stabilizer;

FIG. 10 is a side elevation section illustrating an immersed telescope stabilizer in which the rear or exit window of the stabilizer is provided with paired neutral meniscus lenses so as to omit deflection of exiting light; and, FIG. 11 illustrates the case of the stabilizer of FIG. 10 combined to process light received from a telescope coaxially mounted in front of the stabilizer.

Referring to FIGS. 1–3, a fluid-tight chamber C is illustrated having windows $W_1$ and $W_2$ defining a light path L therethrough. Mounted interior of the light path L by a gimbal mount G is a telescope T biased in alignment to a neutral position by magnets $O_1$, $O_2$, $O_3$ and $O_4$ to receive and emit light passing between window $W_1$ and $W_2$. Fluid F fills chamber C and typically provides neutral buoyant support to telescope T. Additionally, fluid F will provide a fluid couple between the sidewalls of the chamber C and the sidewalls of the telescope T. When this fluid couple is combined with the bias provided by the magnets, a controlled movement of the immersed telescope T can be achieved. This movement when deflecting light path L through the optics of telescope T and focusing lens Q onto image plane I will result in a camera stabilized image. Such stabilization is schematically illustrated in the view of FIG. 2.

Chamber C has a cylindrical section 12 extending between two disc-shaped end walls 14 and 16. Walls 14 and 16 are fastened over the ends of the cylinder 12 so as to form a fluid-tight compartment.

Each of the walls 14 and 16 has as a part of the wall a window $W_1$ (in the case of wall 14) and a window $W_2$ (in the case of wall 16). As here illustrated, windows $W_1$ and $W_2$ define portions of the chamber permitting the light path L to pass interior of the chamber at window $W_1$ and exterior of the chamber at window $W_2$.

Fluid F contained within the chamber is typically a transparent liquid having an index of refraction of approximately 1.3. Additionally, this liquid is chosen to have a wide liquid state under all temperatures of expected operation. For example, one fluid which can be used is a transparent fluorocarbon chemical sold under the trademark "FC43", a product of Minnesota Mining & Manufacturing Company. This liquid has a density 1.9 times that of water and an index of refraction of 1.3. Typically, the chamber can be provided with bellows, a balloon, or alternately a bubble trap to avoid problems of accumulated gases of the fluid within the chamber.

Telescope T is here illustrated as a Galilean telescope having a positive lens 20, a negative lens 22 and an overall magnification of approximately four power. The telescope is affixed to a cylinder 24 and typically is not filled with the fluid F of the bath. In construction, the telescope T is designed preferably for neutral buoyancy with respect to fluid F.

Telescope T is typically affixed to the sidewalls of chamber C by a system of gimbals G. Referring to FIG. 3, it can be seen that paired shafts 25 hold outer gimbal ring 26 and permit pivotal motion of the gimbal ring 26 along the axis defined by shaft 25. Similarly, shafts 28 hold telescope T along an axis orthogonal to the axis defined by shaft 25. It will thus be seen that telescope T is free to move angularly in two degrees of motion about a point defined by the intersection of the axis of shaft 25 and 28 within the fluid F.

For convenience of illustration, it should be understood that this invention will be illustrated using gimbals G. It should be just as apparent to the reader that any other well-known mechanical substitute permitting angular motion of telescope T with respect to light path L could be used in this invention. Moreover, as this particular optical stabilizer is relatively not sensitive to movement of telescope T along or transverse to the optic axis, it is not required that telescope T be affixed to a particular point along the optic axis within the chamber. Rather, it is merely required that the telescope be disposed to intercept the light path L and to undergo a proportional angular motion as will hereinafter be described. For example, it is not required that the axis of shafts 25 and 28 intersect.

It is necessary that the telescope be biased towards a position where lens 20 will be exposed to window $W_1$, and lens 22 exposed to window $W_2$. Accordingly, magnets $O_1$, $O_2$, $O_3$ and $O_4$ are typically provided surrounding light path L.

Each of the magnets $O_1$ through $O_4$ is typically a ring magnet. Magnets $O_1$ and $O_2$ are polarized for mutual attraction. Likewise, magnets $O_3$ and $O_4$ are polarized for mutual attraction. Thus, it will be understood that in the absence of inertial forces and forces from fluid F on telescope T will normally align itself parallel to light path L.

It should be understood that imaging lens Q, herein illustrated as a positive lens and imaging plane I are both affixed to chamber C, and move with the chamber when it undergoes angular motion. Telescope T in combination with the windows $W_1$ and $W_2$ and the index of refraction n of fluid F maintains the image stationary on imaging plane I despite angular movement of chamber C.

Referring to FIG. 2, the immersed telescope stabilizer of this invention is shown being subjected to angular motion. To understand this angular motion, several preliminary observations can be made.

First, it will be understood that telescope T as mounted on gimbals G is placed within a telescope chamber having a substantially square cross section along a longitudinal axis parallel to the optic axis. It has been found that with such a square cross section, telescope T will tend to maintain an unchanged orientation in space while chamber C undergoes a changing orientation in space.

Motion of telescope T will occur due to the fluid couple between the sidewalls of chamber C and the exterior surface of telescope T. Naturally the surfaces on the telescope and chamber effecting the couple could be the lens surfaces and window surfaces respectively.

Moreover, it will be understood that windows $W_1$ and $W_2$ and the interface of fluid F adjacent to them are planar. Thus, a refractive effect of the window-fluid interface will occur.

Assuming that chamber C undergoes tilt of an angle $\theta$ due to accidental angular motion, the passage of light through the stabilizer can be algebraically described. Since fluid F is more optically dense than a standard atmosphere, light entering fluid F will be refracted to an angle $\theta/n$ with reference to the normal to the window where $\theta$ is the angle of chamber tilt and n is the index of refraction of fluid F. It should be understood that since only relatively small angles of deflection of the chamber C will, as a practical matter, occur, the expression of $\theta$ in radians will normally be acceptable rather than the more formal sine function used in gross refractions of light.

The light of path L will be deflected in fluid F from its original angular course according to the equation $\theta - \theta/n$.

Assuming that telescope T has a magnification of M, the deflection of the light ray incident upon window $W_1$ when exiting the telescope T will be $M(\theta - \theta/n)$.

It will be understood for purposes of camera stabilization that the angular deflection of the light path L from the incident ray on window $W_1$ should be equal to $\theta$, thus the desired deflection result can be expressed $\theta - [M(\theta - \theta/n)] = 0$.

Cancelling out $\theta$ and reducing the equation to its simplest form it will be seen that the relationship of telescope magnification M to the index of refraction n of the fluid F within the bath becomes $(M-1)(n-1) = 1$.

Referring to equation $(M-1)(n-1) = 1$, several observations can be made. First of all it should be apparent that the magnification M of telescope T must be other than 1. Further, the index of refraction $n$ of fluid F must also be other than 1.

Substituting (approximately) into the equation above it will be seen that an index of refraction of 1.3 combined with an optical power of telescope T of positive power of 4 will result in a working optical device effecting the desired stabilization.

Moreover, it will be noted that as the index of refraction $n$ approaches unity, the magnification M must be of higher power. Conversely as the magnification M approaches unity, the index of refraction n must be of higher power. Because of these variable relationships it has been found that a telescope T having a magnification in the range of approximately a positive power of four is preferred.

It should be understood that the example used in FIG. 1 utilizes a stabilized telescope in combination with the index of refraction $n$ of a fluid F to produce stabilizing motion. Naturally, if telescope T is not stationary with respect to a point in space, but rather undergoes some movement within chamber C which is proportional to but not the same as motion of the case, the equations set forth thus far must be modified. This may be specifically illustrated with respect to the example shown in FIGS. 4–6.

Referring to these Figures, it will be seen that a chamber $C_1$ has been constructed which has an elongated rectangular section, the elongation occurring parallel to the light path L between window $W_1$ and window $W_2$. It has been empirically found that with this type of chamber configuration, telescope T moves opposite to the inclination of the chamber $C_1$. As chamber $C_1$ is rotated by accidental angular motion in a first direction, telescope T tends to rotate not with the chamber but rather in a direction opposite to the motion of the chamber. To encourage this retrograde motion two annular baffles 31 and 32 are attached to the cylindrical surface of telescope T. The baffles increase the fluid coupling between the fluid F moving along the cylindrical sidewalls 12 and the telescope T.

This angular motion will admit of a rather simple algebraic modification to the equation already set forth.

Assuming that chamber $C_1$ is tilted an angle $\phi$, telescope T will tip with respect to chamber $C_1$ an angle $\theta$. As the movement of the telescope with respect to the chamber will, for the most part, be proportional to the chamber angular movement for the relatively minor angular deviations caused by accidental angular motion.

Assuming that light L is incident on window $W_1$ at an angle $\phi$, it will be deflected towards the optic axis passing through the chamber by the amount $\phi/n$ where $\phi$ is the angle of chamber tilt and $n$ is the index of refraction of fluid bath F. Thus, the light path L interior of the fluid F will be deflected from its original course by an angle $\phi - \phi/n$.

Typically, light will be incident upon telescope T at an angle $(\theta - \phi/n)$ where $\theta$ is the movement of the telescope with respect to its original angular orientation within casing $C_1$. In passing through telescope T the deflection of the light will be equal to $M(\theta - \phi/n)$ where M is the magnification of the telescope T. Finally, and assuming that camera stabilization is desired at the end of the optic path, it will be seen that the desired deflection of light is equal to $[\theta - [M(\theta - \phi/n)] = 0$. Reducing this equation to its simplest form it can be seen that $\theta(M-1) = M/n \, \phi$.

Analyzing the above result it will be apparent that the magnification of the telescope T must be other than 1. Moreover, it will be seen that the equation can be satisfied where the index of refraction n equals approximately 1.3, the magnification of the telescope T equals approximately 2, and the ratio $\theta$ of telescope angular movement to $\phi$ casing angular movement is equal to 1.5.

It will be appreciated that the above description has been for camera stabilization. The image has always been described as impacting the same spot on the image plane. It will be appreciated that where ocular stabilization to the eye is required, modification of the stabilizing formula is required. An illustration of such modification is contained in my above-referenced patent application, Ser. No. 75,965 for "Mirror Stabilizer Having Spaced Reference Motion", filed Sept. 28, 1970, now William E. Humphrey U. S. Pat. No. 3,711,178.

Assuming that the stabilization to be used is to the eye with a total magnification $M_t$ can be described by the equation $M_t = M \times M_o$, where M is the magnification of the immersed telescope and $M_o$ is the magnification of the ocular optics following the immersed telescope. Light leaving the immersed telescope should be compensated by $(\phi/M_o) 1/n$ and light leaving window $W_2$ should be compensated to an angle of $\phi/M_o$.

This modifies the previous equation to the form $\theta(M - 1) = \phi M/n \, (1 \pm 1/M_t)$. positive (+) for inverting optics; and negative (−) for erect optics It should be appreciated that the stabilizer of this invention can be used in various locations along an optical train. For example, where light has been stabilized, downstream optics will not effect light stabilization except in the case where ocular or visual stabilization is designed. Upstream optics, those magnifying optics occurring before the stabilizer will effect stabilization. Such optics are illustrated with respect to FIGS. 7 and 8.

Referring to FIG. 7 a positive lens 40 is mounted to and ahead of casing $C_2$. Window $W_1$ has been provided with a concave configuration when viewed from the exterior of the chamber $C_2$ so as to define a negative fluid lens 42 from fluid F. Similarly, window $W_2$ has been provided with a convex configuration when viewed from the exterior of the chamber. This convex configuration defines a positive fluid lens 44 which is here shown affecting a focus on imaging plate I.

It will be observed that positive lens 40 and negative fluid lens 42 together define a Galilean telescope 46 of magnification $M'$. Assuming that the immersed telescope T includes a magnification of M, it will be seen that the previously defined equation must be modified by the factor $\phi'=\phi M'$ where $\phi$ is the angle of accidental motion of the immersed telescope stabilizer and attached Galilean telescope and $\phi'$ is the angle of the light onto the fluid F before compensation for the index of refraction.

Replacing $\phi$ in the original equations by the new function $\phi'$ will give the result $\theta(M-1)=MM'/n\ \phi$ for camera stabilization and $\theta(M-1)=MM'/n\ \phi\ (1\pm 1/M_t)$ for telescope stabilization.

In each of the foregoing examples it should be noted that all light passing between a window $W_1$ and telescope T and telescope T and window $W_2$ is substantially collimated.

It has been found that reliance upon the fluid bath to deflect light can result in some problems. For example, the indices of refraction of useful transparent liquids are typically relatively low when compared to those of useful transparent glasses. Moreover, viscosity changes and optical changes occurring at the liquid glass interface can interfere with the quality of the optics. Accordingly, and with reference to FIG. 9, an embodiment is illustrated wherein glass windows $W_1$ and $W_2$ can be utilized for this purpose.

With reference to FIG. 9, a chamber is shown defined by a cylindrical sidewall 50 with the window $W_1$ defined from a planoconcave lens 52. Similarly window $W_2$ is defined by a planoconcave lens 53. Lenses 52 and 53 are both positioned with their respective concave sides faced inwardly to define interior of the defined chamber $C_3$ a more or less spherical volume. In this spherical volume there is placed a telescope T.

Telescope T is shown here of the Galilean variety having a planoconvex lens 55 and a planoconcave lens 56. These lenses are in fixed relation interior of telescope T and are typically surrounded by a magnetic ring $O_2$. Complementary to magnetic ring $O_2$ there is a magnetic ring $O_1$ mounted in an interior angular groove in the cylindrical sidewall 50. As will hereinafter appear the complementary rings by their mutual attraction bias immersed telescope T to a neutral position.

Telescope T is mounted to a casing having a planoconvex lens 62 at the forward portion. Lens 62 on its convex surface includes a spherical curvature which is complementary to the spherical curvature of the concave side of planoconcave lens 52.

Similarly, telescope T has attached to its rearward portion a planoconvex lens 63. Planoconvex lens 63 at its convex surface adjacent planoconcave lens 53 has a curvature complementary to the spherically concave side of planoconcave lens 53.

Typically, chamber $C_3$ is filled with fluid. The fluid, lens elements, and air space between the lens elements together with the casing to which they are mounted have the center of gravity and center of floatation of the telescope T all chosen to provide neutral buoyancy and coincidence of the center of gravity and center of floatation. It can thus be seen that with small angular inertial changes, relative movement between the telescope T on one hand and the chamber exterior of the telescope in which it is immersed on the other hand can occur.

As has been described heretofore, relative movement between the telescope on one hand and the chamber on the other hand will be opposed by the bias of the mutually attractive magnetic rings $O_1$ and $O_2$. Thus with all vibrations of relatively high frequency, relative movement between the telescope on one hand and the chamber on the other hand will occur. Conversely, for relatively low frequency vibrational movements, such as those experienced in panning of the optical instrument, alignment of the telescope T to the neutral position with respect to the chamber $C_3$ will occur through the bias supplied by the magnetic forces through rings $O_1$ and $O_2$.

Assuming that lenses 52 and 62 have an index of refraction in $N_1$ and lenses 53 and 63 have an index of refraction $N_2$, a general formula can be set forth where the telescope has a power of m. Specifically, this formula is:

$$(n_1-1)M - (n_2-1) = 1$$

For the case where $n_1 = n_2$ this formula reduces to:

$$(n-1)(m-1) = 1$$

This relation is for camera stabilization.

It should be appreciated, that the stabilizer here could be used in combination with a telescope fixed to sidewall 51 of the chamber between an object and window $W_1$. In such a case and assuming that the magnification of the telescope between an object and the window $W_1$ was of the power $M_1$ and the magnification of the immersed telescope was of the power $M_2$ the relation for camera stabilized optics will be:

$$M_2(n_1 - M_1) - (n_2 - 1) = 1$$

It should be noted that in the case of the stabilizer of FIG. 9 both front window $W_1$ and rear window $W_2$ form an active glass wedge interface. Thus, the glass wedges formed by this embodiment are analogous to the fluid wedges formed by the embodiments illustrated in FIGS. 1-8.

Where lenses are used to generate an optical wedge, the lens shape at one of the windows $W_1$ or $W_2$ can be made to neutralize the wedge effect at one end of a chamber. This is specifically illustrated in the case of the paired neutral meniscus lenses 73 and 83 in the stabilizer of FIG. 10.

Referring to FIG. 10, a cylindrical chamber 51 is illustrated having a frustroconical section 66 reducing its section to a smaller concentric cylindrical end portion 68. Flange 66 defines on its inside surface a spherical surface 70 which is complementary to the spherical surface of menisus lens 73. As before the telescope T is floated interior of a transparent liquid and designed for neutral buoyancy of the telescope T and coincidence between the center of gravity and center of floatation of the telescope T. It will be seen that with angular displacement between the telescope and chamber in which it is immersed neutral meniscus lens 73 attached to the telescope T and neutral meniscus lens 83 attached to the chamber $C_4$ will not generate an optical wedge effect at the rear of chamber $C_4$ when light passes therethrough.

It should be recognized that neutral meniscus lenses 73 and 83 will have the effect of diverging collimated light passing through the stabilizer. This diverging effect can be compensated for in the optics of telescope $T_1$ in the selection of the lenses 55, 56. While downstream optics could be used to effect such a correction, this is not preferred as the stabilizer illustrated here is most useful if it is not dependent upon optics exterior of the stabilizer unit.

Assuming, that in the case of the stabilizer illustrated in FIG. 10, the planoconcave lens 52 forming window $W_1$ and the planoconvex lens 62 attached to the leading portion of telescope T have an indices of refraction n and the immersed telescope includes a magnification of power m, the relation for camera stabilized optics will be:

$$(n-1)(M) = 1$$

It will be noted that this formula has similarity to the formula expressed for the stabilizer of FIG. 1, the difference being that the function $m-1$ is replaced by the function $m$. This difference comes from the fact that an opposite wedge effect is not created at window $W_2$ when light exits the stabilizer.

Referring to FIG. 11, the stabilizer of FIG. 10 is illustrated having a telescope $T_1$ of magnification $M_1$ mounted rigidly to and movable with the exterior cylindrical casing 51 of the stabilizer. As shown in FIG. 2, a telescope $T_2$ of power $M_2$ is immersed interior of the chamber $C_4$ and functions as previously described.

The condition for camera stabilization action for the system of FIG. 11 can be described as:

$$M_2(n-M_1) = 1$$

The total magnification of the system $M_t$ equals:

$$M_t = M_1 M_2$$

The modification of FIG. 11 has two distinct advantages to the apparatus heretofore illustrated. First, the total power $M_t$ can be made unity so as not to modify the field of view when the attachment is used complementary to other existing optics. Secondly, the powers of the telescope can be much closer to unity as both telescopes tend to aid in the stabilization.

For example, where the apparatus of FIG. 11 is constructed of a very low index, low dispersion glass at lenses 52, 62 in the range 1.517 then for the case $M_t = 1.0$, $M_1$ can equal 0.759 and $M_2$ can equal 1.32. This specific embodiment has an overall power of unity, and low power telescope optics.

What is claimed is:

1. An optical instrument for stabilizing an image upon being subjected to angular vibrational orientation, said optical instrument comprising: an optical path for receiving light from an object and transmitting light to an imaging plane; a fluid filled chamber within said optic path including first and second windows for permitting the extrance and exit of light through said chamber; a telescope disposed within said optic path interior of said fluid filled chamber for receiving incident rays from said object and transmitting rays to said imaging plane; means for maintaining said telescope within said optic path interior of said fluid chamber; means biasing said telescope to urge said telescope to a neutral position with respect to said light path; and coupling means on said telescope and on said casing for coupling said telescope through said fluid to urge movement responsive to chamber referenced angular orientation at a rate proportional to the vibrational angular orientation of the instrument.

2. The invention of claim 1 and wherein said fluid is a liquid, is wholly transparent, and surrounds said telescope.

3. The invention of claim 1 and wherein said imaging plane is attached to and moves with said instrument casing.

4. The invention of claim 1 and wherein said coupling means on said chamber includes inside sidewalls of a cylindrical chamber and said coupling means on said telescope includes the lenses of said telescope.

5. The invention of claim 1 and wherein said coupling means on said chamber and said coupling means on said telescope is maintained to move said telescope in space reference motion at a rate proportional to but different than the vibrational angular orientation of the instrument.

6. An optical stabilizer for use in combination with an optical instrument for stabilizing accidental angular orientations including: a chamber; a telescope mounted within said chamber; an optic path through said chamber passing through at least one window formed in a wall of said chamber for permitting the entrance and exit of light interior of said chamber; means for maintaining said telescope along the light path interior of said chamber; means for biasing said telescope to urge said telescope to a preselected neutral position in said chamber for receiving light from said light path and emitting the light to said light path; a transparent fluid interior of said chamber and surrounding said telescope; means on said telescope and said chamber for coupling said telescope in chamber through said fluid for urging said telescope to move responsive to an angular rate proportional to the angular rate of said chamber with respect to a point in space.

7. The optical stabilizer of claim 6 and wherein said chamber includes more than one window.

8. The optical stabilizer of claim 6 and wherein said biasing means includes at least one magnet affixed to said chamber and at least one magnet affixed to said telescope, said magnets polarized for mutual attraction.

9. An immersed telescope stabilizer comprising: a chamber defining an interior fluid tight volume; a transparent fluid confined interior of said chamber; a telescope substantially buoyantly and neutrally supported in the fluid interior of said chamber; first and second window portions formed in said chamber sidewalls for forming in conjunction with the fluid of said bath a light path; first and second refractive interfaces, said first refractive interface for receiving light incident upon said chamber and said second interface for transmitting light emanating from said chamber; means biasing said telescope towards a neutral position with respect to said refractive interfaces; means coupling said telescope to the fluid of said bath for providing a motion to said telescope for overcoming said bias and following the fluid movement of said bath to receive and emanate light; means on said chamber for coupling said fluid to said chamber for imparting motion to said fluid when said chamber is angularly moved in space.

10. The stabilizer of claim 9 and wherein said windows at the interface of said bath are flat.

11. A stabilized optical instrument comprising a first telescope; a second telescope mounted in the light path of said first telescope; a fluid tight chamber mounted about said second telescope having a first window for receiving light emanating from said first telescope and a second window for transmitting light emanating from said second telescope; a fluid confined within said chamber to maintain said second telescope along the light path between said first and second windows; means for biasing said second telescope to a neutral angular alignment with respect to said light path; means on said chamber sidewalls and on said telescope for overcoming said bias and moving said telescope at a rate proportional to the rate of movement of said chamber when said chamber undergoes angular orientation in space.

12. The stabilizer of claim 11 and wherein one of the lenses of said first telescope is formed from the fluid of said chamber.

13. The invention of claim 11 and wherein one of said telescopes is Galilean.

14. An optical instrument for stabilizing an image upon being subjected to angular vibrational orientation, said optical instrument comprising: an optical path for receiving light from an object and transmitting light to an imaging plane; a fluid filled chamber within said optic path including first and second windows for permitting the entrance and exit of light from said chamber; a telescope disposed within the optic path interior of said fluid filled chamber for receiving incident rays from said object and transmitting rays to said imaging plane; means for maintaining said telescope within said optic path interior of said fluid chamber; means for biasing said telescope to a neutral position and means in combination with at least one of said windows for generating an optical wedge proportionate to the relative angular displacement between said telescope and said window.

15. An optical instrument according to claim 14 and wherein said means in combination with said window includes a window to said chamber defined by a concave lens, a convex lens attached to said telescope, said convex and concave lens defining a spherical fluid interface therebetween.

16. The invention of claim 14 and wherein said means for generating an optical wedge includes a first surface on said window exposed to said bath and facing said telescope, a second surface on said telescope exposed to said bath and faced to said window, said surfaces having a configuartion for generating transparent fluid optical wedges proportionate to the angular displacement between said immersed telescope on one hand and said window on the other hand.

17. The invention of claim 14 and means in combination with both said windows for generating paired optical wedges proportionate to relative angular displacement between said telescope and window.

18. The invention of claim 14 and wherein the other of said windows in a meniscus lens.

* * * * *